United States Patent
Palmer, Jr.

(10) Patent No.: US 12,431,939 B2
(45) Date of Patent: Sep. 30, 2025

(54) NEAR FIELD COMMUNICATION MODULE

(71) Applicant: Ingenutec, LLC, Knoxville, TN (US)

(72) Inventor: Robert G. Palmer, Jr., Knoxville, TN (US)

(73) Assignee: Ingenutec, LLC, Knoxville, TN (US)

( * ) Notice: Subject to any disclaimer, the term of this patent is extended or adjusted under 35 U.S.C. 154(b) by 336 days.

(21) Appl. No.: 18/206,359

(22) Filed: Jun. 6, 2023

(65) Prior Publication Data

US 2023/0396289 A1     Dec. 7, 2023

Related U.S. Application Data

(60) Provisional application No. 63/349,295, filed on Jun. 6, 2022.

(51) Int. Cl.

| | |
|---|---|
| *H05K 5/00* | (2025.01) |
| *G06F 21/86* | (2013.01) |
| *H04B 5/00* | (2024.01) |
| *H04B 5/77* | (2024.01) |
| *H05K 1/02* | (2006.01) |
| *H05K 5/03* | (2006.01) |
| *H05K 5/06* | (2006.01) |
| *H05K 7/14* | (2006.01) |
| *H04B 5/20* | (2024.01) |

(52) U.S. Cl.
CPC ........ *H04B 5/77* (2024.01); *H04B 5/20* (2024.01)

(58) Field of Classification Search
None
See application file for complete search history.

(56) References Cited

U.S. PATENT DOCUMENTS

| 7,054,162 | B2* | 5/2006 | Benson | H01L 23/57 361/752 |
|---|---|---|---|---|
| 7,807,934 | B2* | 10/2010 | Ford | H05K 3/284 29/830 |
| 8,279,075 | B2* | 10/2012 | Fleischman | G06F 21/86 340/657 |
| 8,687,371 | B2* | 4/2014 | Arshad | H05K 1/0275 235/382 |
| 8,836,509 | B2* | 9/2014 | Lowy | G06F 21/86 361/752 |

(Continued)

*Primary Examiner* — Tuan A Tran
(74) *Attorney, Agent, or Firm* — Luedeka Neely, P.C.

(57) ABSTRACT

A Near Field Communication (NFC) apparatus comprises a main printed circuit board and tamper printed circuit board. On the top side of the main printed circuit board are a secure memory element that stores secure applications and secure data, a secure microcontroller that contains firmware for communicating with an external HOST device, and an NFC reader chip. On the bottom side of the main printed circuit board are multiple tamper connection pads and a HOST connector for electrically connecting the main printed circuit board to the external HOST device. The tamper printed circuit board, which is attached to the bottom side of the main printed circuit board, includes a tamper mesh for protecting the main printed circuit board from tampering, multiple connecting pads that are electrically connected to the tamper connection pads on the main printed circuit board, and an aperture that is aligned with and receives the HOST connector when the tamper printed circuit board is attached to the main printed circuit board.

11 Claims, 7 Drawing Sheets

(56) References Cited

U.S. PATENT DOCUMENTS

| | | | | |
|---|---|---|---|---|
| 8,953,330 | B2* | 2/2015 | Shi | H05K 5/0208 |
| | | | | 361/752 |
| 9,009,860 | B2* | 4/2015 | Klum | G06F 21/86 |
| | | | | 726/34 |
| 9,271,410 | B2* | 2/2016 | Lin | H05K 5/0047 |
| 9,600,693 | B2* | 3/2017 | Klum | G06F 21/86 |
| 9,798,902 | B2* | 10/2017 | Ludlow | G06F 21/86 |
| 9,877,383 | B2* | 1/2018 | Brodsky | H05K 1/181 |
| 9,894,749 | B2* | 2/2018 | Brodsky | H05K 1/0275 |
| 9,904,811 | B2* | 2/2018 | Campbell | G06F 21/86 |
| 9,924,591 | B2* | 3/2018 | Brodsky | H05K 7/023 |
| 10,192,076 | B1* | 1/2019 | Razaghi | G06F 21/87 |
| 10,237,964 | B2* | 3/2019 | Isaacs | H05K 3/30 |
| 10,257,924 | B2* | 4/2019 | Busby | H05K 1/0275 |
| 10,312,625 | B2* | 6/2019 | Andre | H05F 3/02 |
| 10,531,561 | B2* | 1/2020 | Fadden | H05K 1/0275 |
| 11,047,155 | B2* | 6/2021 | Chen | E05B 19/0047 |
| 11,061,846 | B2* | 7/2021 | Bartley | G06F 21/88 |
| 11,379,624 | B2* | 7/2022 | Mobley | G09C 1/00 |
| 11,797,966 | B2* | 10/2023 | Razaghi | G07F 7/088 |
| 12,093,924 | B2* | 9/2024 | Bianconi | G06K 7/0082 |
| 2010/0177487 | A1* | 7/2010 | Arshad | H05K 1/0275 |
| | | | | 361/737 |
| 2011/0048756 | A1* | 3/2011 | Shi | H05K 7/00 |
| | | | | 174/50 |
| 2011/0240737 | A1* | 10/2011 | Chiu | G06K 7/0091 |
| | | | | 326/8 |
| 2014/0325688 | A1* | 10/2014 | Cashin | G06F 21/86 |
| | | | | 726/34 |
| 2015/0201513 | A1* | 7/2015 | Czobel | H05K 5/0208 |
| | | | | 361/752 |
| 2021/0141946 | A1* | 5/2021 | Lee | H04L 9/0894 |

* cited by examiner

NEAR FIELD COMMUNICATION MODULE

FIELD

This invention relates to Near Field Communications (NFC). More particularly, this invention relates to an NFC module having a main PC board containing circuitry and software required to perform NFC reading associated with secure payment transactions and security access control applications.

BACKGROUND

Most smartphones and some other mobile devices and non-mobile devices are equipped with Near Field Communication (NFC), which is a proximity-based wireless communication standard. For short-range implementations, an NFC reader circuit—such as in a smartphone—uses inductive coupling, which involves generating a magnetic field by passing an electric current through a coil. When a second NFC device (with its own coil) is brought near to the reader module, the field from the reader module induces an electric current within the second device. Once an initial handshake between the reader module and the second device is complete, data stored on the second device is wirelessly transmitted to the reader.

NFC may be used for secure payment transactions and security access control applications. In secure payment applications, the second NFC device may be in the form of a chip embedded in a credit card, mobile phone, or other device that contains the chip and an antenna, and that uses EMV security technology to create a secure one-of-a-kind code for each financial transaction.

NFC reader modules used in secure payment transactions and security access control applications generally include a tamper detection and prevention device. This device may comprise a tamper shield in the form of a security mesh that encompasses any components that contain sensitive data. Such components may include a secure microcontroller and the connection between the NFC chip and the secure microcontroller. The secure microcontroller contains an encryption key that it generates and stores in battery-backed RAM. Any sensitive data stored outside the microcontroller, or in the microcontroller but not in a secure area, is encrypted with this internal key. If tampering is ever detected, the key is immediately erased, thus rendering the sensitive data inaccessible (within the scope of the encryption algorithm used). The general idea is to create a cage around the components that, if removed or cut through, will trigger a tamper detection and erase the encryption key.

In some cases, the tamper shield is a box lined with a flexible PC board material that contains at least two layers of circuit traces with a maximum circuit trace width of 0.006 inches and a maximum spacing between the traces of 0.006 inches. The traces wind around on the PC board across the surface and between layers in a pattern that is difficult to discern from inspection and in such a way as to make it very difficult to drill through or cut through without breaking a trace which would trigger the tamper detection circuit.

The traces of the tamper shield are connected to the microcontroller via conductive pads on the main PC board and similar conductive pads on the tamper shield that align with the conductive pads of the PC board. The connection between the tamper shield and the PC board is usually made using adhesives or polymers that allow current flow only in the vertical (Z) axis, thus providing a connection between the PC board on which the microcontroller is mounted and the tamper shield. The connection can also be made using solder if the tamper shield materials can withstand the heat of the soldering process.

Generally, the PC board should be protected on its top and bottom sides. The tamper shield can fully encompass the PC board, or it can be attached to one side and the tamper circuitry can be embedded into the PC board on the other side. Although embedding the tamper shield into the PC board is very effective, it is also costly because it usually adds four layers and requires blind and buried vias that significantly increase manufacturing costs.

SUMMARY

The above and other needs are met by a Near Field Communication (NFC) apparatus comprising a main printed circuit board and tamper printed circuit board. On the top side of the main printed circuit board are a secure memory element that stores secure applications and secure data, a secure microcontroller that contains firmware for communicating with an external HOST device, and an NFC reader chip. On the bottom side of the main printed circuit board are multiple tamper connection pads and a HOST connector for electrically connecting the main printed circuit board to the external HOST device. The tamper printed circuit board is disposed adjacent the bottom side of the main printed circuit board. The tamper printed circuit board includes a tamper mesh for protecting the main printed circuit board from tampering, multiple connecting pads aligned with and electrically connected to the tamper connection pads on the main printed circuit board, and an aperture that is aligned with and receives the HOST connector when the tamper printed circuit board is attached to the main printed circuit board.

BRIEF DESCRIPTION OF THE DRAWINGS

Other embodiments of the invention will become apparent by reference to the detailed description in conjunction with the figures, wherein elements are not to scale so as to show the details more clearly, wherein like reference numbers indicate like elements throughout the several views, and wherein.

DETAILED DESCRIPTION

Figure 1:
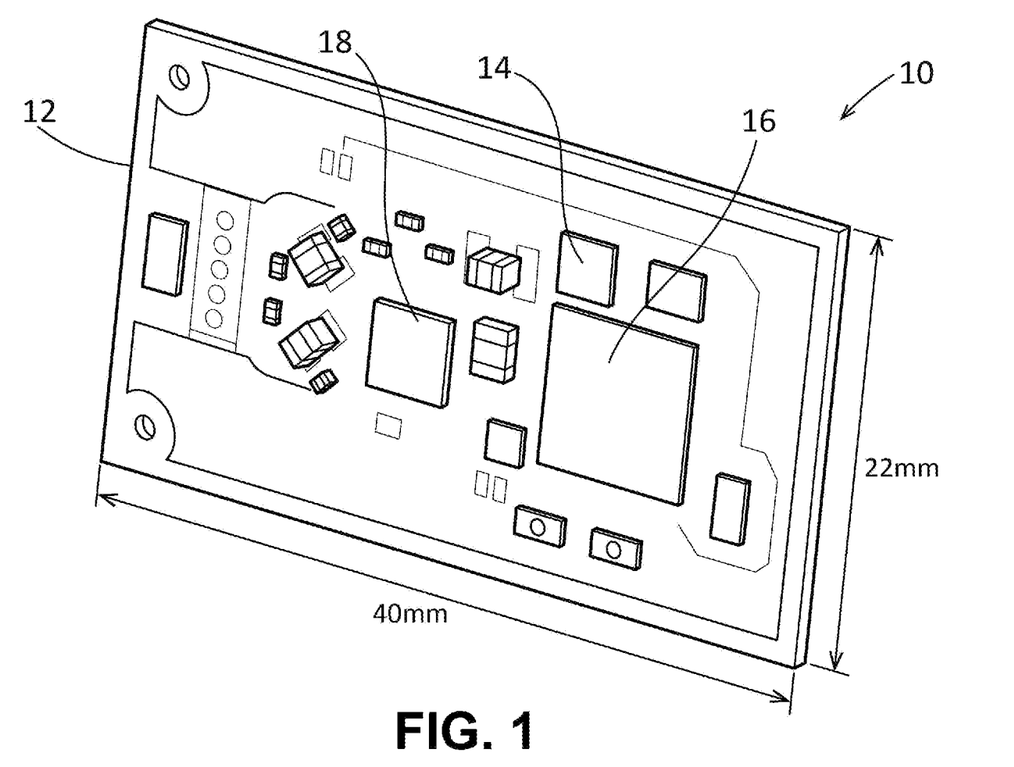
FIG. 1 depicts a top side of an NFC module according to an embodiment of the invention.

As shown in FIG. 1, embodiments described herein are directed to a small NFC module 10 comprising a main PC board 12 that contains all of the circuitry and software required to perform NFC reading, except for an antenna and matching network. The main PC board 12 includes a secure memory element 14 that stores secure applications and secure data, a secure microcontroller 16, and an NFC reader chip 18. In a preferred embodiment, the NFC module 10 comprises a physical module that can replace existing NFC circuitry of an NFC reader, such as in a mobile device, a retail counter-top payment terminal, or a security access control device (wall reader for unlocking a door).

The microcontroller 16 contains firmware for:

communicating with an external HOST device, such as a mobile phone or an access control reader, through a single Board-to-Board HOST connector 20;

managing the NFC reader chip 18 and defining the processes the NFC reader chip 18 performs, including the ability to read and write RFID cards and devices that use 13.56 Mhz RFID protocols (ISO-14443, ISO-15693, ISO-18092 and Felica);

communicating with the secure memory element 14 and with any secure process that exists within the secure memory element 14, including but not limited to secure data storage and cryptographic calculations; and providing security processes to protect itself and the data on which it operates. Should one of these security processes detect a compromise, the microcontroller 16 renders itself inoperable and makes the data inaccessible.

Figure 7:
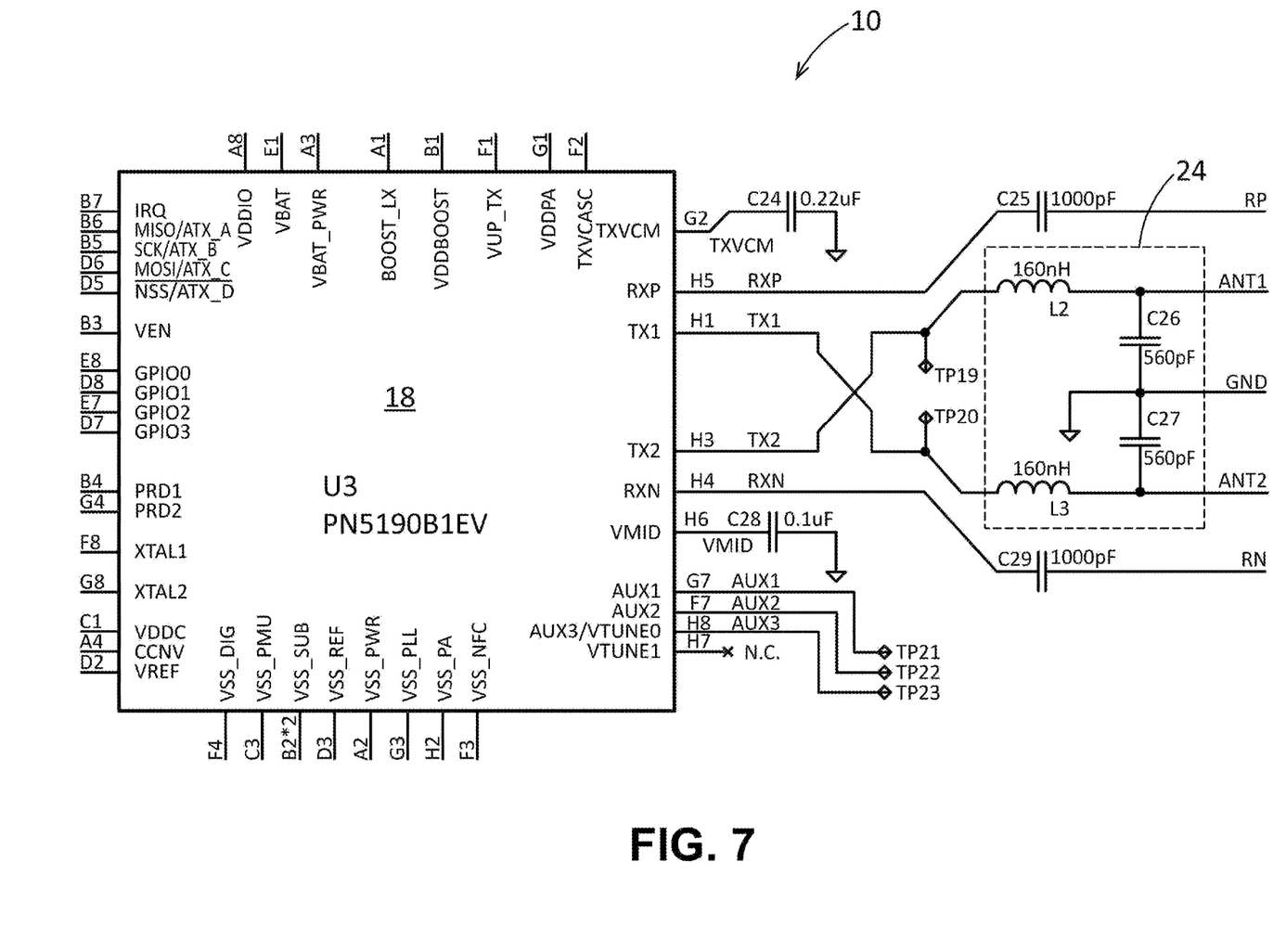
FIGS. 7 and 8 depict schematic diagrams of the NFC module according to an embodiment of the invention.
Figure 8:
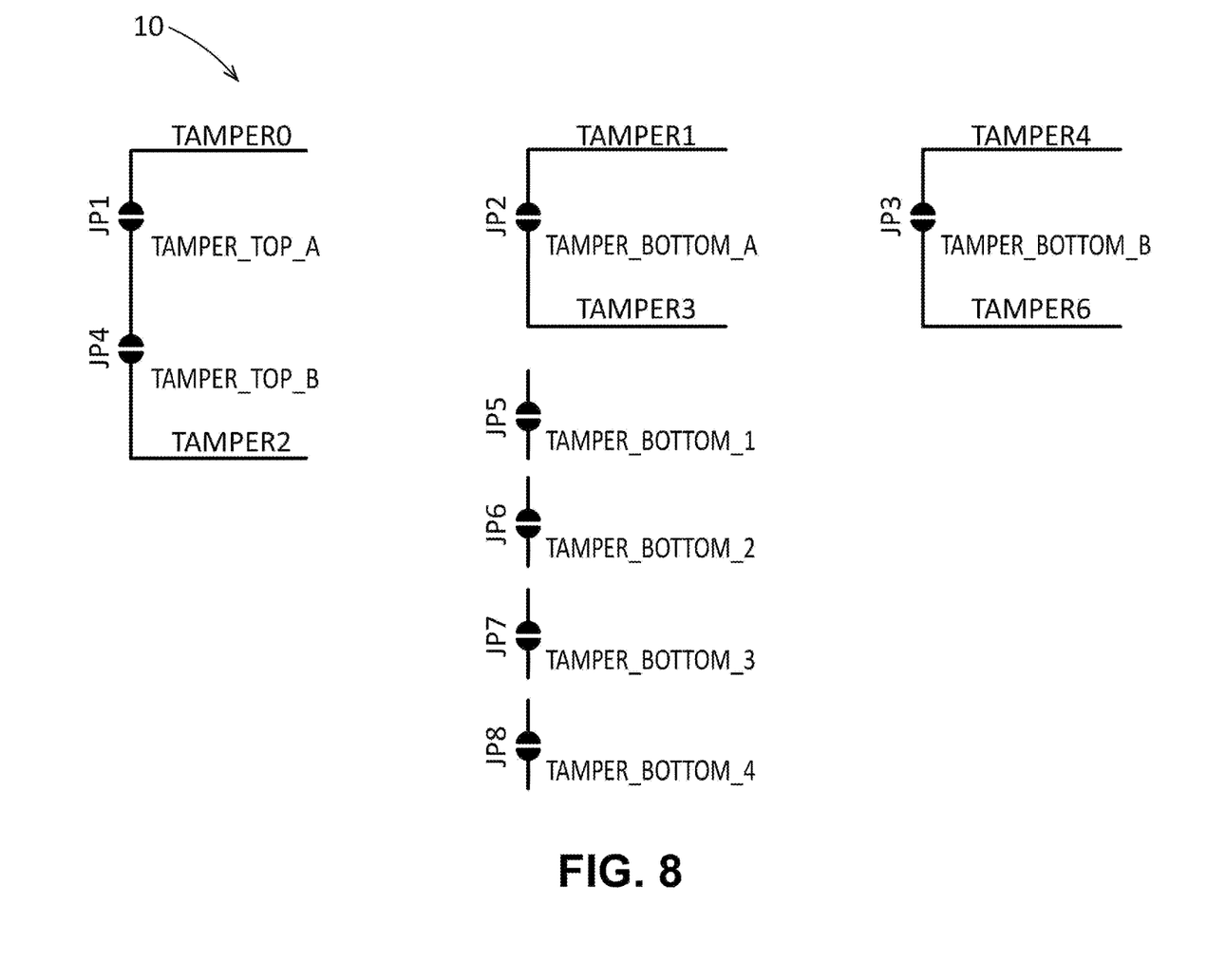

As shown in FIG. 7, the NFC module 10 also contains an EMC circuit 24 that modifies the signal coming out of the NFC reader chip 18. In preferred embodiments, the final matching circuit and antenna are not on the module but are connected to the NFC module 10 through a connector or header.

Figure 2:
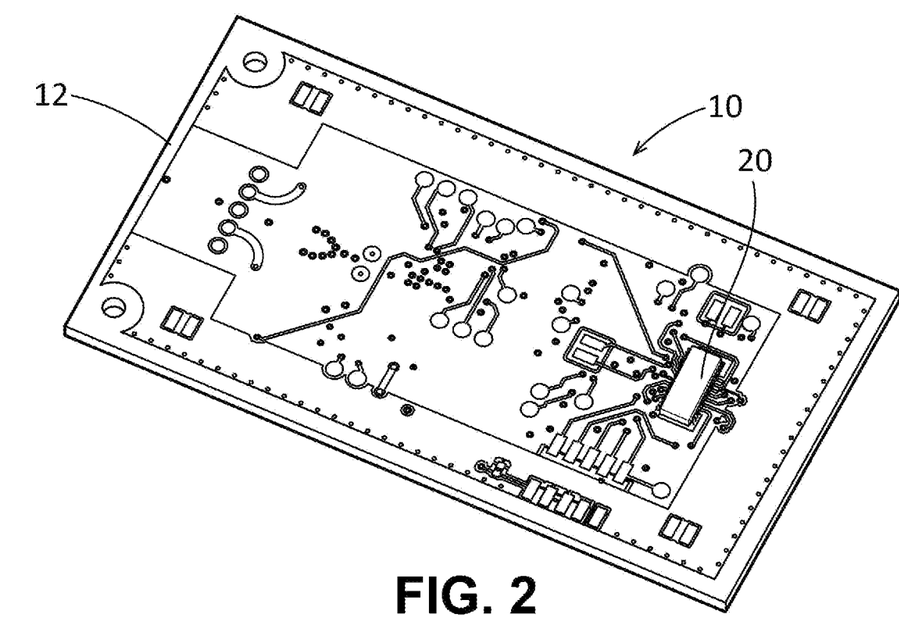
FIG. 2 depicts a bottom side of the NFC module according to an embodiment of the invention.
Figure 3:
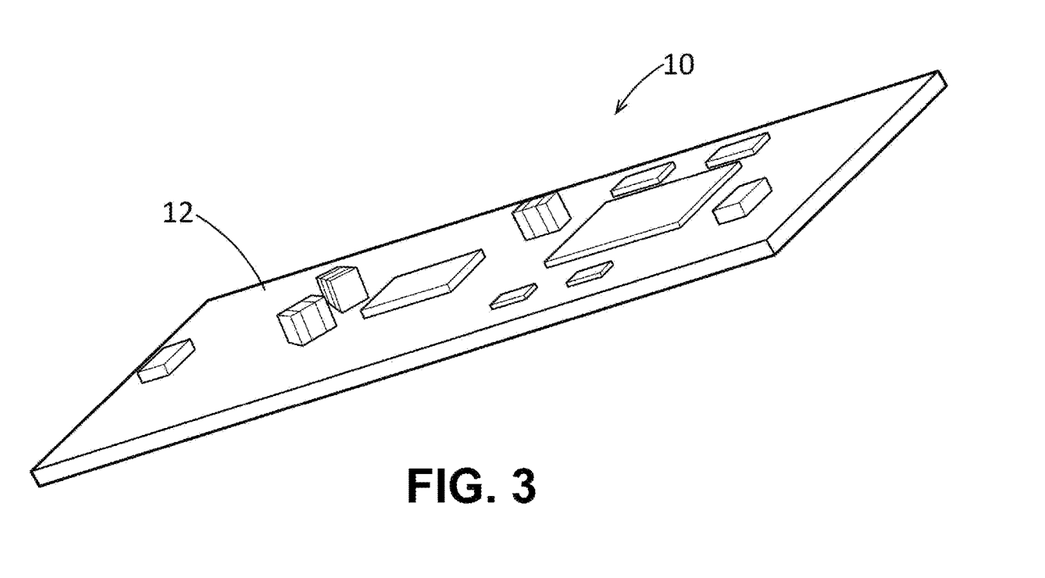
FIG. 3 depicts a top side and edge of the NFC module according to an embodiment of the invention.
Figure 4:
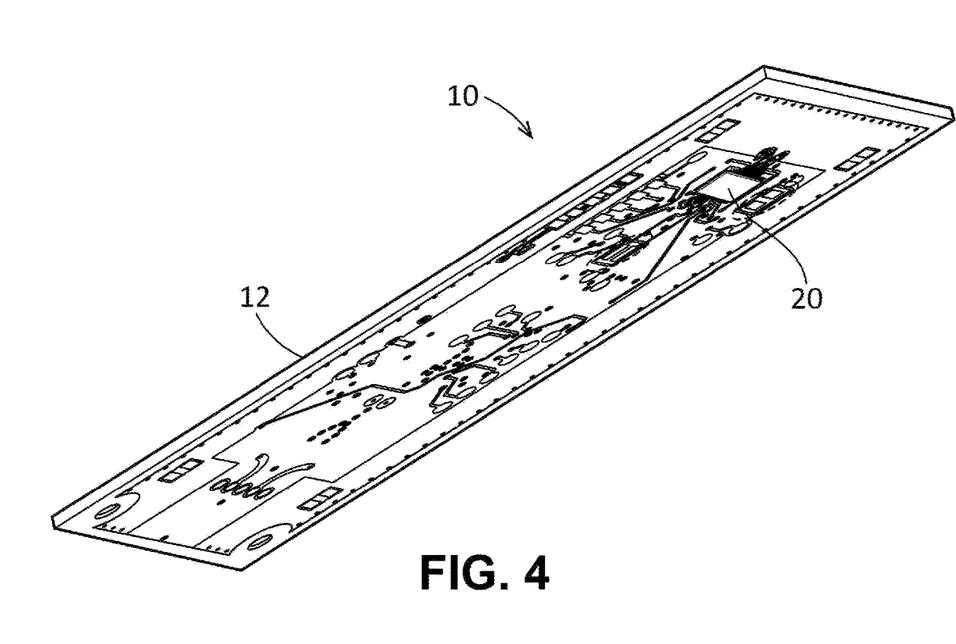
FIG. 4 depicts a bottom side and edge of the NFC module according to an embodiment of the invention.
Figure 5:
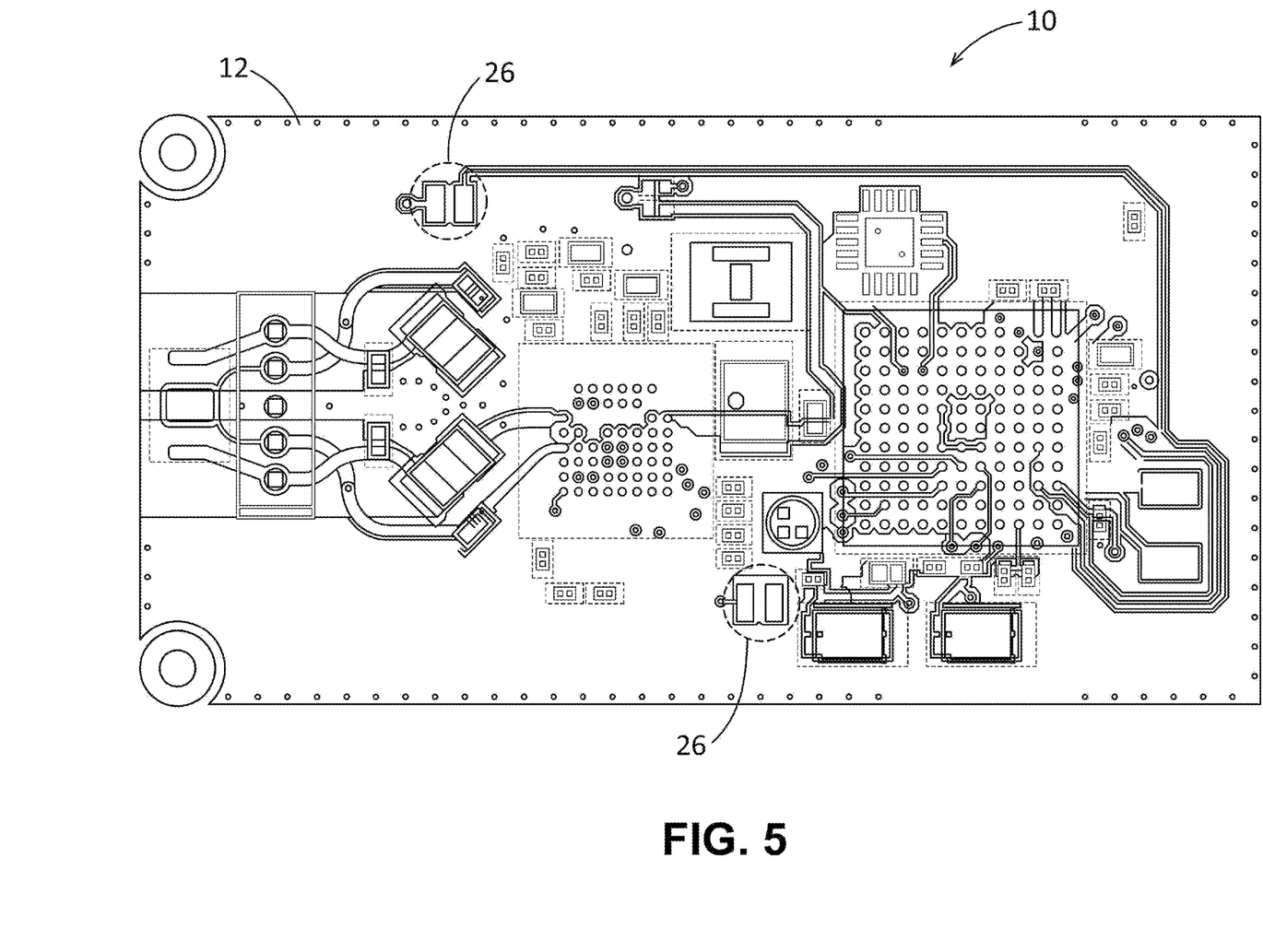
FIG. 5 depicts a PC board layout of the top side of the NFC module according to an embodiment of the invention.
Figure 6:
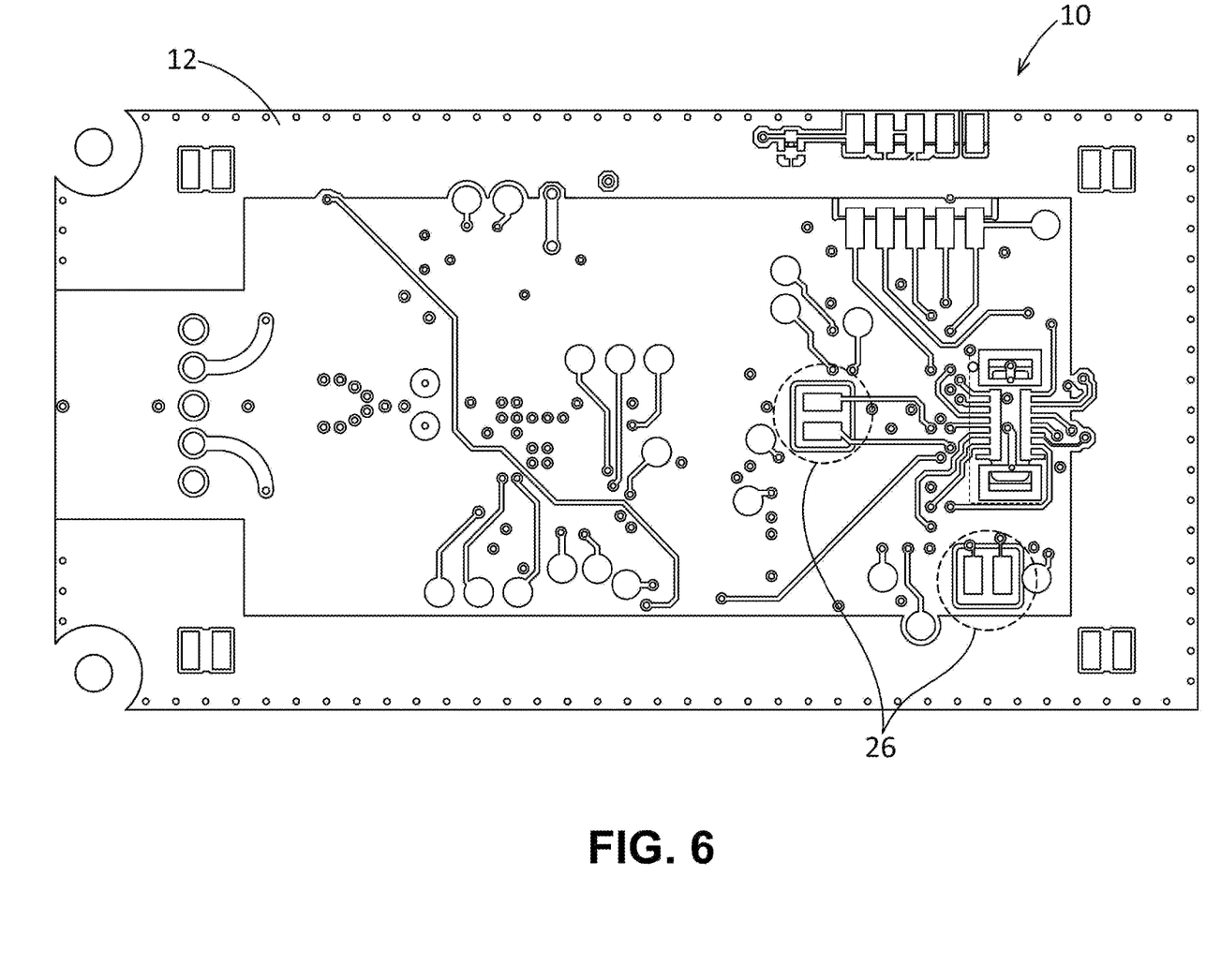
FIG. 6 depicts a PC board layout of the bottom side of the NFC module according to an embodiment of the invention.
Figure 9:
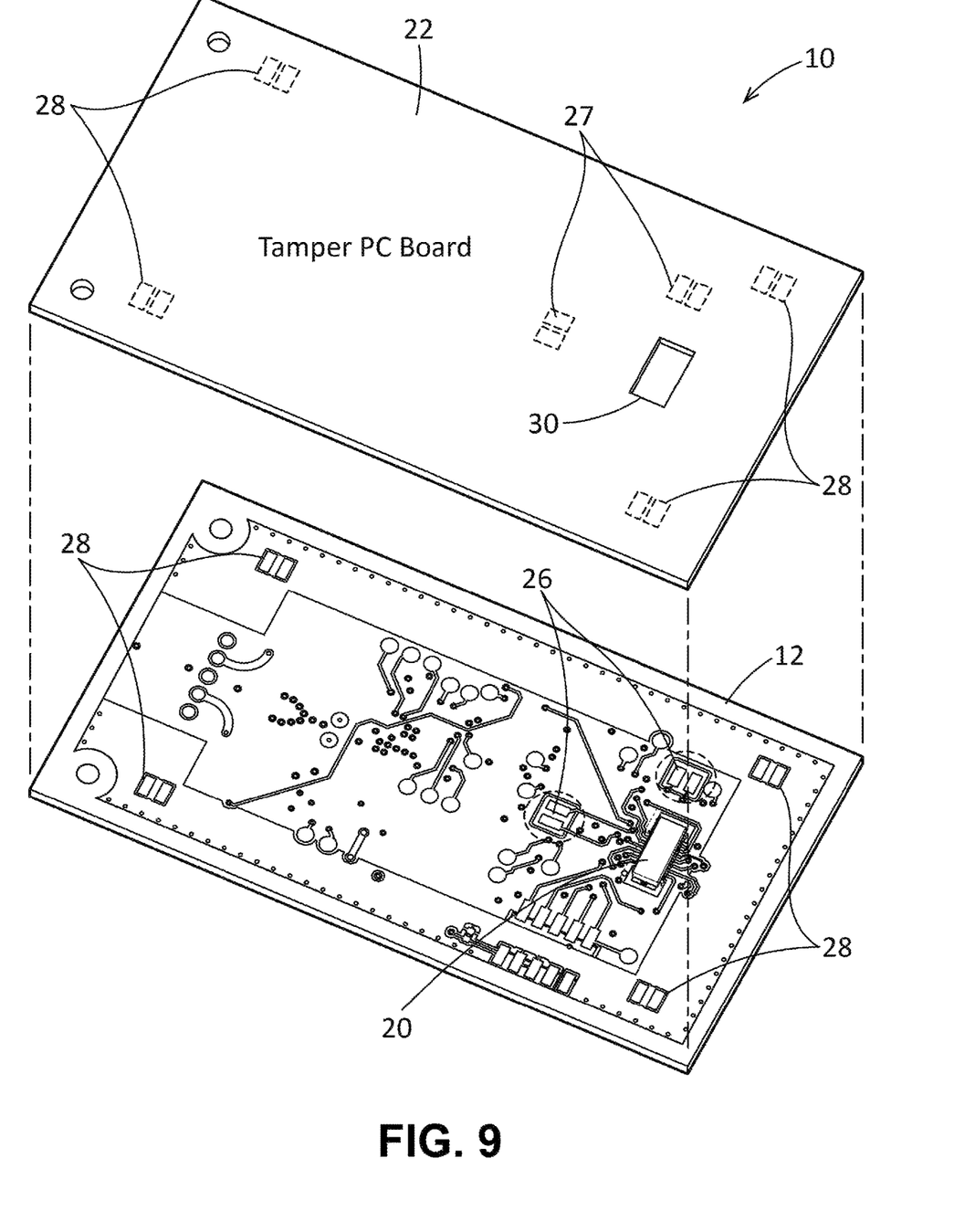
FIG. 9 depicts an exploded view of the NFC module and tamper PC board according to an embodiment of the invention.

As shown in FIGS. 2, 4 and 9, a single low-profile HOST connector 20 is provided on the bottom side of the main PC board 12 to connect the main PC board 12 to a HOST device outside the NFC module 10. This HOST connector 20 is preferably the only component on the bottom side of the main PC board 12. In a preferred embodiment, all other components are on the top side of the main PC board 12. As shown in FIGS. 5, 6, 8 and 9, both sides of the main PC board 12 have two sets of tamper connection pads 26 (also referred to as tamper mesh connection pads) that can be configured in firmware to define which pads should be connected. The tamper mesh for the bottom side of the main PC board 12 comprises a second PC board 22 containing all of the tamper traces, also referred to as the tamper PC board 22. The tamper PC board 22 requires no circuit elements other than connecting pads 27 that align with the tamper connection pads 26 on the main PC board 12 and the traces that comprise the tamper mesh itself. The tamper PC board 22 is soldered to the bottom side of the main PC board 12 using the tamper connection pads 26 as the solder connection points and possibly additional solder mating pads 28 for mechanical connection only. The tamper PC board 22 has a hole 30 for accessing the HOST connector 20, but otherwise it covers and makes inaccessible the test points and the programming header connections on the main PC board 12 that are important during the manufacturing process and the development process. The tamper PC board 22 is preferably thinner than the HOST connector 20. As shown in FIG. 9, the preferred embodiment of the tamper PC board 22 has the same mechanical dimensions and screw mounting holes as the main PC board 12.

It should be appreciated that the main PC board 12 can be manufactured using lower-cost design and manufacturing methods (e.g., only through-hole vias) and marketed without the tamper-resistance components when tamper resistance is not required. In applications in which tamper resistance is required, the tamper PC board 22 containing the tamper mesh can be added as an option. In this case, only the tamper PC board 22 will have the higher-cost manufacturing features, such as blind and buried vias.

In one preferred embodiment of the NFC module 10, the secure memory element 14, the secure microcontroller 16, and the NFC reader chip 18 are on the top side of the main PC board 12, and the HOST connector 20 is on the bottom side. The HOST connector 20 is designed so that the spacing between the bottom side of the main PC board 12 and the HOST PC board is only 1 mm. This leaves only enough room to add the tamper PC board 22 between the main PC board 12 and the Host PC board 32. This protects the bottom side of the main PC board 12 from external attack. The top side of the main PC board 12, on which the secure memory element 14, the secure microcontroller 16, and the NFC reader chip 18 are mounted, requires a standard tamper protection mechanism that connects to the tamper pads on the top side of the main PC board 12.

In an alternative embodiment of the NFC module 10, the top side of the main PC board 12 is completely blank, and all components (secure element, secure microcontroller 16, NFC reader chip 18, and HOST connector 20) are on the bottom side. In this embodiment, a first tamper mesh PCB board is mounted on the top side, in the same manner as described above for the tamper mesh PC board mounted on the bottom side. This configuration makes access from the top side virtually impossible and access from the bottom side much more difficult, as access would have to be made from the edges via a 1 mm spacing between the main PC board 12 and the first tamper mesh PC board. Also, the NFC module 10 is connected to the HOST via a single 1 mm spacing connector 20. If this HOST connector 20 becomes disconnected, then tamper detection is triggered. In this embodiment, a second tamper mesh PC board is mounted on the bottom side of the main PC board 12. The second tamper mesh PC board has a cutout in its center to accommodate the components while maintaining connection to the tamper connection pads 26 on the bottom side of the main PC board 12. This leaves only the area under the components on the HOST PC board as potentially accessible. Protection of that remaining area would be accomplished using existing tamper design techniques or using the same tamper PC board design described herein.

Additional Features that Differentiate the Present Invention from Conventional NFC Reader Modules on the Market.

First, the NFC module 10 described herein includes a secure memory element 14 not found in conventional NFC readers. The secure memory element 14 securely stores keys required for payment and access control. These keys can be easily updated using industry standard methods (TR31 key blocks and TR34 key transfer), thereby enabling simpler integration into key management infrastructures. The secure memory element 14 is also programmable, thereby offering end users the ability to define their own secure applications for the secure memory element 14 to provide, such as non-standard authentication exchanges, and general storage of secure data that may be important to the end user.

Second, the NFC module 10 described herein is very small, and is specifically designed to fit inside mobile devices, such as smartphones. Conventional NFC readers on the market are much larger and are designed to fit within larger enclosures and contain bigger connectors and components. Those larger NFC readers preclude them from being incorporated into mobile devices and require even more general-purpose products to make space for the larger sized module. Thus, the NFC module 10 described herein makes the addition of NFC reading functionality to a mobile device much simpler. It also makes development of other readers (e.g., countertop payment terminals and access control readers on door frames) simpler and enables the use of smaller NFC readers with better performance than that of current NFC readers.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A Near Field Communication apparatus comprising:
   a main printed circuit board having a top side and a bottom side, the main printed circuit board including:
      a secure memory element disposed on the top side that stores secure applications and secure data;
      a secure microcontroller disposed on the top side, the secure microcontroller containing firmware for communicating with an external Hardware Oriented Security and Trust (HOST) device;
      a Near Field Communication reader chip disposed on the top side;
      a plurality of tamper connection pads disposed on the bottom side; and
      a HOST connector disposed on the bottom side for electrically connecting the main printed circuit board to the external HOST device; and
   a tamper printed circuit board disposed adjacent the bottom side of the main printed circuit board, the tamper printed circuit board comprising:
      a tamper mesh for protecting the main printed circuit board from tampering;
      a plurality of connecting pads aligned with and electrically connected to the plurality of tamper connection pads; and
      an aperture aligned with the HOST connector, the aperture for receiving the host connector when the tamper printed circuit board is attached to the main printed circuit board.

2. The Near Field Communication apparatus of claim 1 wherein the HOST connector and the plurality of tamper connection pads are the only components disposed on the bottom side of the main printed circuit board.

3. The Near Field Communication apparatus of claim 1 wherein the plurality of tamper connection pads includes two sets of tamper connection pads, and the firmware in the secure microcontroller defines which of the two sets of tamper connection pads are connected to the plurality of connecting pads.

4. The Near Field Communication apparatus of claim 1 wherein the tamper mesh and the plurality of connecting pads are the only circuit elements on the tamper printed circuit board.

5. The Near Field Communication apparatus of claim 1 wherein the plurality of connecting pads are soldered to the plurality of tamper connection pads.

6. The Near Field Communication apparatus of claim 1 wherein:
   the main printed circuit board includes test points and programming header connections that are used during manufacturing and development processes; and
   the tamper printed circuit board covers and makes inaccessible the test points and programming header connections on the main printed circuit board.

7. The Near Field Communication apparatus of claim 1 wherein the tamper printed circuit board is thinner than the HOST connector.

8. The Near Field Communication apparatus of claim 1 wherein the tamper printed circuit board has the same mechanical dimensions as main printed circuit board.

9. The Near Field Communication apparatus of claim 1 wherein mounting screw holes in the tamper printed circuit board are aligned with mounting screw holes in the main printed circuit board.

10. The Near Field Communication apparatus of claim 1 wherein the secure memory element securely stores encryption keys required for payment and access control, which keys can be updated using industry standard methods.

11. The Near Field Communication apparatus of claim 1 wherein the secure memory element is programmable, thereby allowing end users to define customized secure applications to be provided by the secure memory element.

* * * * *